United States Patent [19]

Bode

[11] Patent Number: 4,683,273

[45] Date of Patent: Jul. 28, 1987

[54] POLYESTER AND EPOXY RESIN COATING

[75] Inventor: Daniel Bode, Cleveland, Ohio

[73] Assignee: The Glidden Company, Cleveland, Ohio

[21] Appl. No.: 867,050

[22] Filed: May 27, 1986

[51] Int. Cl.$^4$ .............................................. C08L 63/10
[52] U.S. Cl. ...................................... 523/412; 525/63
[58] Field of Search ................... 523/412, 416; 525/63

[56] References Cited

U.S. PATENT DOCUMENTS 3,991,028  11/1976  Irwin ................................. 523/412

FOREIGN PATENT DOCUMENTS 50-17100  6/1975  Japan ................................. 523/416
50-17099  6/1975  Japan ................................. 523/416

*Primary Examiner*—C. Warren Ivy
*Attorney, Agent, or Firm*—Thomas M. Schmitz

[57] ABSTRACT

Polymer composition particularly useful as protective surface coatings comprise an aqueous mixture of epoxy-acrylic graft copolymers combined with a functional low molecular weight polyester and minor amounts of an amine derivative crosslinking resin. The low molecular weight polyester contains reactive hydroxyl or carboxyl functional groups and a molecular weight less than about 2,000.

8 Claims, No Drawings

POLYESTER AND EPOXY RESIN COATING

This invention relates to polymeric compositions particularly useful in surface protective coating compositions, and more particularly pertains to aqueous blends of certain polyester and epoxy resin graft polymer particularly useful as coating compositions for interior beverage and food container and similar can coating applications.

Epoxy resins are particularly desirable for use in surface coating materials as a vehicle or polymeric binder for pigments, fillers, and other additives whereby epoxy resins advantageously provide toughness, flexibility, adhesion, and chemical resistance. Water-dispersed coating compositions containing epoxy resins are highly desirable for can coating compositions. Coatings for soft drink and beer cans, for instance, are critical due to taste sensitivity wherein such sanitary can coatings must not alter the product taste of canned beverages. Taste problems can occur in a variety of ways such as by leaching of coating components into the beverage, or by adsorption of flavor by the coating, or sometimes by chemical reaction, or by some combination thereof. In commonly assigned U.S. Pat. No. 4,212,781, a process is disclosed for modifying epoxy resin by reacting the epoxy resin with addition polymerizable monomer in the presence of at least 3% by weight of benzoyl peroxide (or the free radical initiating equivalent thereof) based on monomer at a suitable reaction temperature. This reaction produces a reaction mixture containing an in-situ formed blend of resinous materials comprising an epoxy-acrylic copolymer mixture containing epoxy resin, graft epoxy-acrylic polymer, and associatively-formed ungrafted addition polymer. The in-situ polymerized monomers include acid functional monomers to provide acid functionality in the reaction mixture sufficiently high to effect stable dispersion of the resulting reaction product in a basic aqueous medium. In a preferred embodiment of U.S. Pat. No. 4,212,781, a polyglycidyl ether of bisphenol-A is reacted with a mixture of addition polymerizable monomers containing an arylic such as methacrylic acid. The epoxy resin has a molecular weight above 4,000 and provides from 50% to 90% of the initial reaction mixture. The reaction takes place in the presence of benzoyl peroxide at an elevated temperature above 80° C. and preferably between about 110° C. and 130° C. to effect addition polymerization of the monomer and produce addition polymer grafted to the epoxy resin. The reaction product can be dispersed in a basic aqueous medium to form a water-reducible epoxy-acrylic copolymer mixture.

It now has been found that certain carbon graft and ester graft epoxy-acrylic copolymers combined with certain low molecular weight polyester polymers having a number average molecular weight below about 2000, provide an an aqueous dispersion of an exceptionally versatile thermosetting composition coreactive with a compatible fluent amine derivative cross-linking component. The amine derivative preferably is an etherified aminoplast or glycoluril. The epoxy-acrylic copolymer and the polyester polymer are mutually compatible and contain functional hydroxyl or carboxyl groups which advantageously are adapted to coreact and cross-link with amine derivative to produce a cured paint film comprising an interpenetrating network of cross-linked polyester and epoxy-acrylic polymer chains. The cured film of this invention exhibits superior film integrity properties including extraordinary flexibility and hardness, excellent adhesion, toughness, and impact resistance. A further advantage is the ability to obtain higher film weights by rollercoat application. These and other advantages of this invention will become more apparent by referring to the detailed description of the invention and the illustrative examples hereinafter.

SUMMARY OF THE INVENTION

Briefly, the invention comprises an aqueous polymeric composition based on the combination of epoxy-acrylic copolymer and low molecular weight polyester polymer wherein the polymers contain reactive hydroxy or carboxyl groups adapted to be coreactive and become cross-linked with an etherified amine derivative coreactive cross-linking component. Preferably, the composition comprises by weight between 65% and 90% epoxy-acrylic polymer, 7% and 25% polyester polymer and 2% and 10% amine derivative crosslinking resin, wherein the foregoing totals 100%. The composition can be efficiently heat cured at low temperatures.

DETAILED DESCRIPTION OF THE INVENTION

The water reducible coating composition of this invention is based on the combination of polymers including low molecular weight polyester polymer, epoxy-acrylic graft copolymer and coreactive cross-linking amine resin such as melamine or glycoluril.

Referring first to the epoxy-acrylic graft copolymers, the epoxy-acrylic copolymer is a graft copolymer comprising epoxy resin coreacted with monomers including acrylic monomers to produce an epoxy-acrylic graft copolymer. The preferred epoxy-acrylic copolymer comprises an epoxy-acrylic graft copolymer containing epoxy resin, epoxy-acrylic graft copolymer, and ungrafted addition polymer produced by polymerizing ethlenically unsaturated monomers in-situ with epoxy resin in the presence of a benzoyl peroxide (or equivalent) as more particularly set forth in U.S. Pat. No. 4,212,781, and said patent is incorporated herein by reference. The in-situ polymerization of monomers generally comprises reacting the ethylenically unsaturated monomers in the presence of epoxy with at least 3% of benzoyl peroxide by weight of the monomer. The in-situ formed carboxyl-functional polymer can have a molecular weight between 5,000 and 20,000 and preferably between 7,000 and 15,000. The carboxyl content (-COOH) should comprise at least 2% by weight of the monomer mixture and preferable should be above 5%.

The acrylic portion of the epoxy-acrylic copolymer comprises polymerized ethylenically unsaturated monomers which include carboxyl functional monomers such as acrylic acid and lower alkyl substituted acrylic acids such as methacrylic acid to provide carboyl functionality means for dispersing the epoxy-acrylic copolymer mixture into water. The preferred acrylic acid is methacrylic acid. The balance of the monomers preferably are nonreactive under the contemplated conditions of polymerization, although small amounts of other reactive monomers may be used such as hydroxy monomers illustrated by 2-hydroxy ethylmethacrylate, amide monomers illustrated by acrylamide, or N-methylol monomers illustrated by N-methylol acrylamide. The remaining monomers are nonreactive but copolymerizable monomers illustrated by acrylate and methacrylate esters, such as ethyl acrylate, methyl methacrylate or isobutyl methacrylate, styrene, or vinyl toluene, vinyl acetate, vinyl chloride, vinylidene chloride, acrylonitrile, and generally alkyl esters of an acrylic acid, generally the lower alkyl esters, that is, those esters in which the esterifying group contains from 1 to 4 carbon atoms, and particularly ethyl acrylate. Other useful monomers in this class include other $C_{1-15}$ alkyl acrylate esters and methacrylate esters such as, for example, propyl acrylate, isopropl acrylate, butyl acrylate, isobutyl acrylate, tertiary butyl acrylate, pentyl acrylate, decyl acrylate, lauryl acrylate, isobornyl acrylate methyl methacrylate, butyl methacrylate, isobutyl methacrylate, hexyl methacrylate, 2-ethyl hexyl methacrylate, octyl methacrylate, and nonyl methacrylate. Other useful monomers are those readily commercial available monomers having vinyl unsaturation and include styrenic monomers such as styrene, vinyl toluene, divinyl benzene, isoprene and butadiene.

The epoxy resin portion of the epoxy-acrylic copolymer mixture can be either aliphatic or aromatic, although the aromatic epoxy resins are preferred. The most preferred epoxy resins are polyglycidyl ethers of bisphenol-A, especially those having 1,2-epoxy equivalency of from about 1.3 to about 2. The molecular weight should be from about 350 to about 20,000, and preferably, for sanitary coating compositions, from about 4,000 to about 10,000. Mixtures of monoepoxides and diepoxides are desirable. Another procedural variation is the introduction of the aromatic polyether which is devoid of oxirane functionality by reacting epoxide groups with benzoic acid, phenol or similar monoreactive epoxide blocking agent. In preferred practice, the epoxy resin is a mixture including aromatic polyether devoid of oxirane functionality, aromatic polyether having a single oxirane group, and aromatic polyether having two oxirane groups. This mixture of epoxy functionality maximizes compatibility, although the aromatic polyether devoid of oxirane functionality can be added later, and the mixture can be heated and agitated to enhance the intimacy of the association between the various components.

The preferred graft epoxy-acrylic copolymer mixture is prepared by in-situ polymerization of the ethylenic monomers with epoxy resin. The epoxy resin can be heated in a reactor wherein the polymerizable monomer can be added slowly over a period of at least two or three hours along with a solvent and a free radical initiator. Although the reaction may be conducted in the absence of solvent, a solvent system is preferred for the in-situ polymerization of monomers in the presence of epoxy resin. A preferred solvent system comprises two miscible solvents, one of which dissolves the epoxy resin and the other of which dissolves the monomers. The particular solvents satisfactory for the epoxy resin are solvents such as xylene, benzene, ethyl benzene, toluene, and the alkoxy alkanols. Particular solvents useful with monomers are alcohols such as methanol, ethanol and propanol. Ethylene glycol monobutyl ether, ethylene glycol monobutyl ether acetate, and the like, hexane, mineral spirits, and the like, are also suitable. Ordinarily the amount of solvent may be in the range from about 5% to 30% by weight of the sum of the other components. In practice, the epoxy resin and the mixture of polymerizable monomers are reacted together in the presence of a free radical initiator, preferably of the peroxide type, and benzoyl peroxide is most preferred. Typical and useful free radical initiators include cumene hydroperoxide, benzoyl peroxide, t-butyl perbenzoate, t-butyl peroxide, lauroyl peroxide, methyl ethyl ketone peroxide, chlorobenzoyl peroxide, and the like. Benzoyl peroxide is preferred as the free radical initiator for use in the practice of the present invention. The amount of free radical catalyst is expressed in terms of percentage by weight of benzoyl peroxide based on the total weight of the polymerizable monomer, or equivalent, at the temperature of use. The amount of catalyst should be at least 3%, and preferably more than 4% by weight of benzoyl peroxide or equivalent based on monomer weight. The reaction temperature preferably is maintained in the range from about 80° C. to about 130° C., although the temperature may be adjusted within a relatively wide range to accommodate the reactivity of the mixture. Thus, operating temperatures in the range from about 30° C. to about 200° C. are feasible, depending upon the end results and operating conditions selected. After the monomers are added, the reaction mixture is normally held for up to three hours at reaction temperature to complete the monomer conversions. The in-situ polymerization of the monomers produces an in-situ formed carboxyl functional polymer containing at least about 20% of polymerized monoethylenically unsaturated carboxylic acid monomer based on the total weight of monomers as well as epoxy-acrylic graft polymer and ungrafted epoxy resin, as more particularly set forth in U.S. Pat. No. 4,212,781.

The epoxy-acrylic graft copolymer also can be an epoxy-acrylic ester graft copolymer produced from previously described epoxy resin and copolymerized monomers including carboxyl monomers wherein the epoxy-acrylic ester graft copolymer comprises acidic or carboxylic copolymer esterified with epoxy resin. The epoxy-acrylic ester graft copolymer can be produced by esterifying a solvent-soluble carboxy functional polymer with an epoxy resin wherein the esterification reaction is carried out preferably in an organic solvent and in the presence of sufficiently high amounts of amine catalyst to produce a nongelled epoxy ester graft copolymer. The esterification reaction is carried out in the presence of amine catalyst in sufficient amounts greater than catalytic amounts of 0.3% to avoid gellation and preferably in the presence of greater than 2% amine esterification catalyst based on the weight of reactants subjected to esterification to produce an epoxy-acrylic ester graft copolymer. The preformed acrylic polymer preferably comprises copolymerized ethylenically unsaturated monomers including at least about 20% by weight of copolymerized monoethylenically unsaturated carboxylic acid monomer based on the total weight of copolymer to produce a carboxyl functional prepolymer. The epoxy resin portion comprises at least about 40% of the epoxy-acrylic ester polymer and provides an oxirane functionality in a stoichiometric deficiency with respect to carboxyl functionality in the carboxyl preformed polymer in a ratio of about 1:2 to 1:20 whereby the excess carboxyl functionality in the epoxy-acrylic ester provides a means for dispersing the polymer into water by reacting with a base to render the reaction product self-emulsifiable into water, as further described in detail in U.S. Pat. No. 4,480,058 and EPO publication Ser. No. 0 006 334 published Jan. 9, 1980.

Still a further variation of the epoxy-acrylic graft copolymer can comprise forming a preformed carboxylic polymer of polymerized ethylenic monomers including carboxyl monomers in the presence of melamine resin followed by reacting the preformed carboxylic polymer with epoxy resin in the presence of high amounts of amine as suggested in U.S. Pat. No. 4,289,811 to form an epoxy-acrylic ester graft copolymer.

Referring next to the polyester component of the polymeric mixture, the polyester polymer is a low molecular weight, substantially linear polymer having a molecular weight between about 250 and 2000 and preferably between 400 and 1000 based on number average. Linear aliphatic, non-ether type glycols are esterified with considerably lesser molar amounts of aromatic dicarboxylic acid and a linear saturated dicarboxylic acid havng between 2 and 10 linear carbon atoms such as adipic, azelaic, succinic, glutaric, pimelic, suberic or sebacic acid to produce low molecular weight polyesters. Preferred and commercially available linear saturated dicarboxylic acids are adipic or azelaic acid. Aromatic dicarboxylic acids (anhydrides) include phthalic, isophthalic, terephthalic, and tetrahydrophthalic. Isophthalic is preferred for superior films exhibiting detergent, salt spray and corrosion resistance. On a molar basis, the preferred low molecular weight polyester polymer comprises a ratio of between 1/5 and 5/1 moles of aromatic/linear aliphatic dicarboxylic acid. Suitable glycols include non-ether linear aliphatic glycols having 2 to 8 carbon atoms such as 1,3 or 1,4 butylene glycol, 1,6 hexane diol, neopentyl glycol, propylene glycol and similar linear glycols. Preferred glycol is neopentyl glycol. Small amounts of branching glycols, such as trimethylolethane, trimethylolpropane, glycerine and pentaerythrtol are desirable, The molar excess of the glycol over the lesser molar amounts of aromatic and linear saturated dicarboxylic acid is between about 10% and 80% and preferably between about 20% and 60%. Hence, the polyester contains considerable excess unreacted hydroxyl groups to provide a hydroxy polyester having a hydroxyl number between 115 and 285 and preferably between 175 and 240. Hydroxyl numbers of polymers can be measured in accordance with ASTM D-1957. The polyester contains free carboxyl groups preferably below 15 and typically between 5 and 10. Glycol can be esterified with minor amounts up to about 5% by weight of unsaturated dicarboxylic acids (anhydrides) including maleic, fumaric or itaconic acids; or monocarboxylic acids such as acetic, propyl-, and higher chain aliphatic acids up to about 8 carbon atoms.

The polyester can be produced by solvent or bulk polymerization although bulk polymerizations preferred. The raw materials can be charged in bulk and esterification polymerized at temperatures typically between 180° C. to 240° C. although moderately higher or lower temperatures can be utilized satisfactorily. An esterification catalyst can be used, typically at less than 1% levels based on charge, such as an organo tin compound.

The foregoing hydroxyl functional, low molecular weight polyester polymer and epoxy-acrylic graft polymer are further combined with a coreactive amine derivative cross-linking resin such as aminoplast or phenoplast resin. Aminoplast resins are preferred and further include glycolurils. Examples of useful aminoplast resins are the reaction products of ureas and melamines with aldehydes further etherified with an alcohol. Examples of aminoplast resin components are urea, ethylene urea, thiourea, melamine, benzoguanamine. Aldehydes useful in this invention are formaldehyde, acetaldehyde and propionaldehyde, although formaldehyde is clearly preferred. The aminoplast resins can be used in the alkylol form but, most preferably, are utilized in the ether form by etherifying with a monohydric alcohol containing from 1 to about 8 carbon atoms. In a melamine molecule, for instance, up to 3 of the 6 active hydrogens on the amine group can be advantageously substituted with an alkanol group having 1–8 carbon atoms. Higher levels such as 6 substitution can be used as in Cymel 300 which contains 6 substituted methylol groups. The alkanol groups stabilize the melamine or other amine derivative under ordinary temperatures, but enable heat reaction at higher temperatures. Preferred substitutions are between 2 and 4 substitutions to avoid popping or solvent entrapment with a fast curing film. Examples of aminoplast resins are methylol urea, dimethoxymethylol urea, butylated polymeric urea-formaldehyde resins, hexamethoxymethyl melamine, methylated polymeric melamine formaldehyde resin and butylated polymeric melamine formaldehyde resin. Glycoluril derivatives are disclosed in U.S. Pat. No. 4,064,191 and are also known as acetylendiureas. Glycolurils are derived by reacting two moles of urea with one mole of glyoxal to provide a complex ring structure were substitute constituents can be a hydrogen, or a lower alkyl radical, or can be methylolated partially or fully be reacting with 1 to 4 moles of formaldehyde to provide a methylol glycoluril. The preparation of various glycolurils is illustrated in U.S. Pat. No. 4,064,191 such as tetramethylol glycoluril, tetrabutoxymethyl glycoluril, partially methyolated glycoluril, tetramethoxymethyl glycoluril, and dimethoxydiethoxy glycoluril. Useful glycoluril derivatives include for example, mono- and dimethylether of dimethylol glycoluril, the trimethylether of tetramethylol glycoluril, the tetramethylether of tetramethylol glycoluril, tetrakisethoxymethyl glycoluril, tetrakisopropoxymethyl glycoluril, tetrakisbutoxymethyl glycoluril, tetrakisamyloxymethyl glycoluril, tetrakishexoxymethyl glycoluril and the like. Glycoluril derivatives can further include dimethylol dihydroxy ethylene urea which is disclosed in U.S. Pat. No. 4,540,735 and incorporated herein by reference. Less preferred amine derivatives are phenolplast resins, or phenol-aldehyde resins, which are the reaction products of phenols and aldehydes which contain reactive methylol groups. These compositions can be monomeric or polymeric in nature depending on the molar ratio of phenol to aldehyde used in the initial condensation reaction. Examples of phenols which can be used to make these phenolplast resins are phenol, o, m, or p-cresol, 2,4 xylenol, 3,4-xylenol, 2,5-xylenol, cardanol, p-tert-butylphenol, and the like. Aldehydes useful in this invention are formaldehyde, acetaldehyde and propionaldehyde. Particularly desirable phenolplast resins are polymethylol phenols wherein the phenolic group is etherified with an alkyl, alcohol such as methyl, ethyl, propl, etc. alcohol.

On a polymer solids weight basis, the blend of polymers comprises broadly between 40% and 95% epoxy-acrylic graft polymer, between 5% and 50% polyester polymer, and between 2% and 30% amine derivative cross-linking resin. Preferred polymeric blend compositions comprise 65% to 90% epoxy-acrylic graft copolymer, 7% to 25% polyester polymer and 2% to 8% cross-linker such as aminoplast resin.

The merits of this invention based on the polymeric blend of epoxy-acrylic graft copolymer, low molecular weight polyester polymer, and cross-linking amine resin are further illustrated in the following examples.

EXAMPLE I

A low molecular weight hydroxylated polyester was produced as follows:

|  | Weight | Moles |
|---|---|---|
| Neopentyl glycol | 56.40 | 0.54 |
| Adipic acid | 26.38 | 0.18 |
| Isophthalic acid | 29.99 | 0.18 |
| 0.1% dibutyl tin oxide | 112.77 | |
|  | 12.77 | Water esterification loss |
|  | 100. weight parts of polyester polymer | |

The glycol was charged first to the reactor and heated to about 125° C. to form a melt. Then the adipic and isophthalic acids were added and the mixture was upheated to about 190° C. to remove water of esterification followed by gradual upheat to about 200° C. to 210° C. and held until the Acid No. a below 10 to produce the polyester polymer. The finished polymer was then reduced with xylene and cooled to produce a fluid polyester resin with the following properties.

Acid No. =5
Hydroxyl No =210 (calculated)
% NVm =86.9%
Color =1
Molecular weight (no. average) =466 (calculated)

EXAMPLE II

Similar to Example I, low molecular weight hydroxylated polyesters were produced as follows:

|  | Weight |
|---|---|
| Raw Materials | |
| Neopentyl glycol | 55.10 |
| Trimethylol proane | 1.21 |
| Adipic acid | 26.43 |
| Isophthalic acid | 30.05 |
| Resin characteristics | |
| Acid No. | 7.1 |
| Hydroxyl No. | 210 |
| % NVM | 85.8 |
| Solvent | Xylene |
| Molecular weight | 475 |
| Raw materials | |
| Neopentyl glycol | 56.41 |
| Adipic acid | 26.38 |
| Isophthalic acid | 25.49 |
| Terephthalic acid | 4.49 |
| Resin characteristics | |
| Acid No. | 6.9 |
| Hydroxyl No. | 210 |
| % NVM | 85.4 |
| Solvent | Xylene |
| Molecular weight | 466 |

EXAMPLE III

Preparation of Epoxy-Acrylic Copolymer Mixture

A plant batch was prepared according to the following procedure: 231 pounds of epoxy resin (DER-333) were heated in an agitated reactor to about 82°; 117 pounds of bisphenol-A were added with agitation. DER-333 is a liquid epoxy resin based upon bisphenol-A/epichlorohydrin typically having an epoxide equivalent weight of 192-197 and a viscosity at 25° C. of 2,300-4,600 CPS. The reactor then was heated to about 191° over a period of about 2 hours and held there for an additional 2 hours. Periodic testing for viscosity and percent oxirane was made. Target oxirane value was about 0.6% and viscosity at 25° C. between Z and $Z_1$ (Gardner-Holt). When these values were obtained, 135 pounds of 2-butoxyethanol-1 were added, followed by 203 pounds of N-butanol. The molecular weight of the epoxy resin at this point was about 5,500 based on oxirane content. In a separate vessel, there was loaded and mixed the following: 64 pounds of methacrylic acid, 40 pounds of styrene, 44 pounds of ethyl acrylate, and 10 pounds of benzoyl peroxide. This monomer mixture was added gradually to the reactor containing the epoxy resin over a period of 2 hours at uniform rate. The reaction temperature was maintained at 118°. Viscosity was checked periodically on samples. The batch was cooled to 85°; its Acid Number on solids was 85.

The resin batch then was fed into an agitated reducing vessel containing a mixture of 1,095 pounds of deionized water (resistivity at least 50,000 ohm-cm) and 57 pounds of dimethylethanolamine. The temperature of the resulting blend was 50°. It was held there for about an hour, then the blend was cooled to below 32° by adding 500 pounds of the cool deionized water.

EXAMPLE IV

Preparation of Epoxy-Acrylic Ester Graft Copolymer (a) Epoxy resin. To a 12-liter round-bottomed, 4-necked flask was charged 4144 g. of a liquid spray resin, DER 333 (fromm Dow Chemical Company, Midland, Mich.), 2135 g. of bisphenol A, annd 409 g. of 2-butoxyethanol-1. A water-cooled condenser was placed on one neck of the flask, an air driven mechanical stirrer was placed through the second neck, and a nitrogen feed was placed through the third, and a thermometer was placed through the fourth neck of the flask. Heating was started and the mixture in the flask was stirred under a vacuum of 15 inches. The temperature was raised to 140° C. whereupon the heating and vacuum were discontinued. About 40 g. of a volatile was collected comprising water, xylene, (from DER 333) and 2-butoxy-ethanol-1. The exotherm carried the reaction temperature to about 175° C., where it was held for 5 hours. The viscosity of the epoxy resin after one hour was Y Gardner-Holt (40% solution in 2-butoxyethanol-1), Y+after 3 hours, and Z after 5 hours. At the end of the 5-hour hold, 1012 g. of 2-butoxy-ethanol-1 was added, and the epoxy solution was let to cool to room temperature.

(b) Acrylic terpolymer. To a 12 liter 4-necked round-bottomed flask was charged 5503 g. of n-butanol. Through the 4 necks were placed a water cooled condenser, an air-driven mechanical stirrer, a thermometer-nitrogen inlet line and monomer addition funnel. The solvent was heated to 113° C. A monomer mixture of 1764 g. of methacrylic acid, 924 g. of styrene, 26 g. of ethyl acrylate, 182 g. of benzoyl peroxide was slowly added to the refluxing solvent. The addition took 2 hours, and the reaction mixture was held at 114° C. for another hour before cooling to room temperature. The non-volatile of the reaction mixture was 34.7.

Epoxy-Acrylic Ester Graft Copolymer

Into a 5-liter round-bottomed, 4-necked flask was charged 1306 g. of epoxy resin (a), and 694 g. of the acrylic resin (b). The reaction mixture was stirred under nitrogen sparge and heated to 105° C. and held at that temperature for 4 hours. At the end of the hold, 23.6 g. of dimethylethanol amine and 144 g. of 2-butoyethanol-1 were added in 4 minutes, and the reaction mixture was held at 102°–105° C. for ½ hour. The viscosity of the resin is U ¼, (from 1 part resin, 1 part pyrol). Into a 2 gallon stainless steel container was charged 2043 g. of deionized water and 86.1 g. of dimethylethanol amine. The container was heated so that the temperature of the water was 50° C. before 1500 g. of the resin from the 5-liter flask was dropped into the agitated water. An emulsion formed easily and the nonvolatile of the emulsion was 23.5%, viscosity Ford #4 cup 38 seconds, acid number 34.1 and base number 76.4.

EXAMPLE V

Epoxy-Acrylic Copolymer Mixture

A plant batch was prepared as follows: 10,332 pounds of Shell Epon 828 at 95% N.V. in xylene were heated under agitation to about 82° C.; 5,559 pounds of bisphenol A were added, followed by 2,808 lbs. of butoxyethanol. EPON 828 is a liquid diglycidyl ether of bisphenol-A typically having an epoxide equivalent weight of 185–192 and a viscosity at 25° C. of 11,000–15,000 CPS. A mixture of 5.48 pounds of sodium acetate trihydrate in 11.5 pounds of water was added to the batch. 20" of vacuum was applied for 45 minutes during upheat to 120° C.; 187 pounds of volatiles were removed. Exotherm carried the batch temperature of 175° C. where it was held for three hours. The Gardner-Hold viscosity, at 40% N.V. in butoxy ethanol, was Y-Z, 1,822 pounds of butoxy-ethanol and 2,332 pounds of xylene were added as the batch was cooled to 124° C. A mixture of acrylic monomers, initiator, and solvents composed of methacrylic acid—2,273 pounds, styrene—4,546 pounds, ethyl acrylate—71 pounds, benzoyl peroxide—468 pounds, xylene—686 pounds, and dipropylene glycol monomethyl ether—922 pounds was added to the reaction mixture over a 2 hour period and held for an additional 2 hours in the range of 122°–125°. The batch was dropped into a reducing tank containing 28,545 pounds of deionized water, 1,709 pounds of Phenodur PR-307, and 1,928 pounds of DMAMP-80. The Phenodur material is an unplasticized thermosetting phenolic resin supplied as a 65% solids solution in mixed solvents. The DMAMA-80 is 2-dimethyl amino-2-methyl-1-propanol. The temperature of the reducing tank climbed from an initial 60° to 95° C. It was cooled to less than 35° in a few hours. The final N.V. was 36.6 at a viscosity of 95 sec, #4 Ford.

EXAMPLES VI–X

The emulsion of Example V was formulated with a silicone surfactant and a lubricant to improve the appearance of a rollcoated film.

A hexamethoxymethyl melamine crosslinker (HMMM) and the polyester of Example I were added to the emulsion under agitation. viscosity for rollcoating was adjusted with deionized water and an amine. It was found that the addition of the polyester produced higher non-volatile levels and thicker films upon rollcoating. Tests of the films are shown in the table below for several formulations.

|      | V*  | I*  | HMMM* | MEK Rubs | Pencil Hardness | Porosity | Blush | Adhes. Failure | % Wedge Bend |
|------|-----|-----|-------|----------|-----------------|----------|-------|----------------|--------------|
| VI   | 100 | —   | 2.2   | 36       | F               | 2        | 4     | 0              | 52.1         |
| VII  | 100 | 2.5 | 2.5   | 85       | H               | 1        | 0     | 0              | 25.6         |
| VIII | 100 | 3.8 | 2.5   | 70       | H               | 1        | 0     | 0              | 27.0         |
| IX   | 100 | 6.3 | 2.5   | 56       | F               | 1        | 0     | 0              | 35.2         |
| X    | 100 | 3.8 | 3.2   | 112      | F               | 1        | 0     | 0              | 33.7         |

*parts added

I claim:

1. An aqueous coating composition containing a polymeric binder comprising on a weight basis:
   between 65% and 90% of an epoxy-acrylic graft copolymer, between 7% and 25% of a low molecular weight, hydroxyl functional polyester polymer, and between 2% and 10% amine derivative crosslinking resin selected from an aminoplast or phenoplast resin wherein the combination equals 100%;
   said polyester polymer being a substantially linear polyester polymer having a number average molecular weight between about 250 and 2,000 and hydroxyl number between about 115 and 285;
   said epoxy-acrylic graft copolymer being selected from (a) an epoxy-acrylic carbon-carbon graft copolymer produced by copolymerizing ethylenically unsaturated monomers in the presence of epoxy resin and at least 3% by weight peroxide initiator based on monomers copolymerized to produce an in-situ formed carbon-carbon graft epoxy-acrylic copolymer, or (b) an epoxy-acrylic ester graft copolymer produced by esterifying a preformed acrylic copolymer containing carboxyl groups with epoxy resin in the presence of at least 2% by weight amine based on reactants to produce an ester graft epoxy-acrylic copolymer.

2. The coating composition in claim 1 wherein the polyester comprises a linear, non-ether glycol esterified with lessor molar amounts of a saturated dicarboxylic acid and the molar amounts of glycol in excess of said dicarboxylic acid is between 10% and 80%.

3. The coating composition in claim 2 wherein dicarboxylic acid comprises a ratio between 1/5 and 5/1 moles aromatic dicarboxylic acid to aliphatic dicarboxylic acid.

4. The coating composition of claim 2 wherein the dicarboxylic acid comprises a linear saturated dicarboxylic acid having between 2 and 10 linear carbon atoms.

5. The coating composition in claim 4 wherein the dicarboxylic acid is selected from adipic, azelaic, succinic, glutaric or sebacic acid.

6. The coating composition in claim 3 wherein the aromatic dicarboxylic acid comprises isophthalic acid.

7. The coating composition in claim 3 wherein the aromatic dicarboxylic acid is selected from phthalic, isophthalic, terephthalic and acid or anhydride.

8. the coating composition in claim 1 wherein the dicarboxylic acid comprises tetrahydrophthalic acid or anhydride.

* * * * *